May 1, 1956
C. E. BRICKER
2,743,790
BRAKE WITH SOFT STEEL RETURN SPRING
Filed March 27, 1953
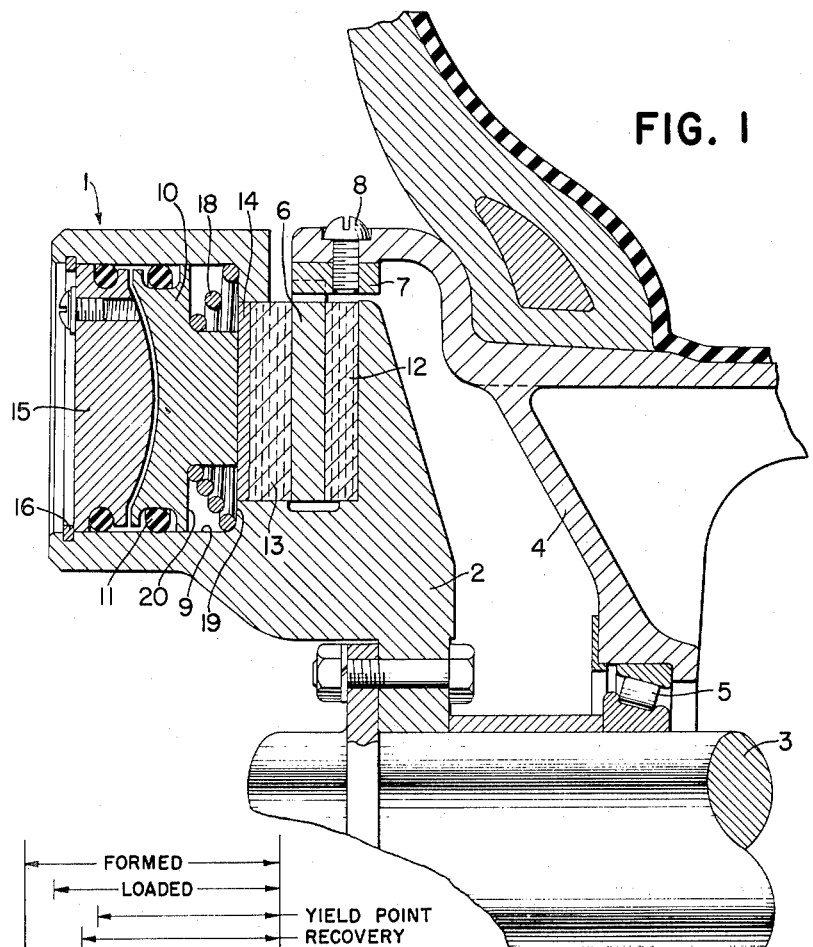
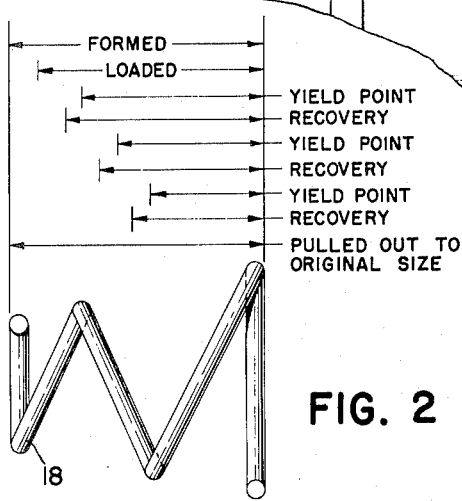
FIG. 2
INVENTOR.
CARL E. BRICKER
BY
R. L. Miller
ATTORNEY United States Patent Office 2,743,790
Patented May 1, 1956

2,743,790

BRAKE WITH SOFT STEEL RETURN SPRING

Carl E. Bricker, Akron, Ohio, assignor, by mesne assignments, to The Goodyear Tire & Rubber Company, a corporation of Ohio Application March 27, 1953, Serial No. 344,963

3 Claims. (Cl. 188—152)

This invention relates to brakes, especially to "spot" type brakes, and it particularly relates to a brake of such type which has a soft steel return spring therein.

In brake constructions, suitable means are provided for energizing the brakes to force a brake lining into contact with the braking surface, such as a brake disk. The brake also may include some type of means for retracting the brake lining and associated actuation apparatus into a retracted or inoperative position where the brake lining is out of contact with the braking surface. Various return mechanisms have been provided for automatically positioning the brake lining in inoperative position and the problem of positioning the brake lining in desired spaced relationship to the braking surface is complicated by virtue of the fact that initially the block of brake lining is quite thick, such as one-half inch or more, whereas it may be desired to wear such brake lining block down to a thickness of 3/16 inch or less before it is replaced with a new block. Also, it is very desirable that the brake lining block be positioned immediately adjacent the braking surface when the brake lining block and associated means are inoperative so that upon the instant of brake actuation, the brake lining block must move but a very short distance before it is brought into operative engagement with a braking surface. In order to achieve a desired type of a control upon brake block positioning means in spot type brakes to position the braking means in desired inoperative positions, various rather complicated controls have been developed, and these controls are relatively costly to construct and to assemble. Also, the previous controls may require some maintenance when in use, or the control may even become inoperative due to mechanical failure.

It is therefore the general object of the present invention to provide a new and improved positioning means in a brake, which means comprises a return spring constructed and arranged to provide an automatic return of the braking means to a clearance or inoperative position upon brake release and by the spring taking a permanent set as brake lining block wear occurs and the spring is relatively greatly compressed with relation to its original size but with the spring having some return resistance even after taking a permanent set.

Another object of the invention is to use a soft steel return spring in a brake, which spring has a low carbon content and which has no hardening alloys therein so that the spring has a relatively low yield point and takes a permanent set readily as compression of the spring occurs.

Another object of the invention is to provide a relatively inexpensive, uncomplicated construction in brakes for returning a brake lining block to a small clearance inoperative position automatically upon brake release.

Yet a further object of the invention is to provide a brake return spring which can be compressed by increments to a relatively great compression with relation to the original spring length and to take a permanent set several different times at various compression points, but which spring can be pulled out to substantially its original length and be used for further progressive compression and permanent set cycles.

The foregoing and other objects and advantages of the invention will be made more apparent as the specification proceeds.

The present invention relates to a brake assembly comprising a brake lining block, a brake disc, a cylinder, a piston slidably received in the cylinder and secured to the brake lining block, and pressure means for forcing the piston along the cylinder to bring the brake lining block into contact with the brake disc. A soft steel return spring is compressed between the piston and a cylinder end for moving the piston back into the cylinder a short distance when the pressure means are released, which short return movement occurs even after the brake lining block has been reduced in size appreciably from its original thickness, and the return spring has taken a permanent set from its original length.

In the accompanying drawings, one embodiment of the principles of the invention is shown and the drawings comprise:

Fig. 1 which is a fragmentary vertical section of a wheel and brake assembly of the invention; and Fig. 2 which is a diagram of an operative cycle of the spring of the invention.

In the accompanying drawing and specification, corresponding numerals are used to refer to corresponding parts to facilitate comparison between the specification and drawings.

Reference now is directed to the details of the structure shown in the drawings and a brake is indicated as a whole by the numeral 1. This brake 1 has a brake housing 2 that is suitably secured to a fixed support means, such as an axle 3. The brake 1 is used in combination with a conventional wheel 4 which is journalled on a bearing 5 carried by the axle 3. The wheel 4 carries a brake disc 6 which is engaged with the wheel 4 for rotation therewith by conventional means such as a number of axially directed keys 7 that are secured to the wheel 4 by cap screws 8. The brake disc 6 is conventionally positioned for movement in a direction axially of the brake 1 only by the keys 7 engaging slots in the periphery of the brake disc 6 so that the brake disc can move axially as brake lining block wear occurs. The brake housing 2 positions substantially conventional spot type of braking means therein so that at least one axially directed cylinder 9 is formed in the brake housing 2 and a piston 10 is slidably received in the cylinder 9. The piston 10 is sealed with relation to the cylinder by conventional sealing means, such as an O-ring 11.

The drawing shows one brake lining block 12 which is fixedly secured to the brake housing 2 adjacent a side face of the brake disc 6 by suitable means (not shown), while a second brake lining block 13 is movably positioned on the opposite side of the brake disc 6. Usually the brake lining block 13 has a metal disc 14 on a face thereof and suitable means (not shown) secure the brake lining block 13 and metal disc 14 to the piston 10 for movement therewith.

The open end of the cylinder 9 is closed by conventional means, as by an end cap 15 that is retained in place by a lock ring 16. An O-ring, or similar sealing member, is carried by the end cap 15 to seal it in the cylinder 9. Thus any suitable brake actuating means may provide liquid under pressure intermediate the inner surface of the end cap 15 and the adjacent surface of the piston 10 to produce movement of the piston towards the brake disc 6 in order to achieve a braking action at desired times.

The axially inward movement of the piston 10 forces the brake lining block 13 against the brake disc 6 and moves the brake disc axially in order to bring the opposed face of the brake disc into braking engagement with the fixedly positioned brake lining block 12. After brake actuation, it is necessary that a suitable operative clearance be provided in the brake 1 and to this end a simple but effective construction is provided by the invention. Thus a soft steel return spring 18 is positioned intermediate a shoulder 19 formed at an end of the cylinder 9 and a shoulder 20 provided on the axially inner surface of the piston 10. The brake return spring 18 will be compressed on movement of the piston 10 towards the brake disc 6; and the spring, when braking forces are released, will move the piston 10 and associated means slightly axially outwardly of the brake in order to provide the desired small operative clearance in the brake.

It is an important feature of the invention that the return spring of the invention has a composition that is slow to work harden, and which takes a permanent set at a relatively low stress when the spring is distorted, but with the spring being of a nature that it still would have a slight return spring action after being stressed past its yield point, in order to provide the clearance required in the brake for operation. The return spring naturally is free from any hardening alloys. Another important feature of the soft steel return spring is that after it has gone through a complete compression cycle in which it has taken a new permanent set several times as the original relatively thick brake lining blocks 12 and 13 are worn down to a minimum thickness, the soft steel return spring 18 can be stretched out to substantially its original length and have another operative cycle and this stretching out and re-use of the spring can be repeated several times before the spring would break or be otherwise rendered inoperable. It will be realized that almost any type of a steel spring could be used for one compression cycle if it has been satisfactorily annealed to give the spring a relatively low yield point.

The action of the steel spring of the invention is that of any steel part when the material is stressed beyond its yield point, as the original material inherently has a small amount of spring-back from the stressed position to which the material has been moved. However, the spring takes a permanent set on relatively low compression and the return movement of the spring is only a small fraction of the original amount of compression of the spring required to distort it beyond its yield point.

While any suitable material can be used to make the return spring 18, usually steel is the material used as other materials are too low in modulus. One material for the spring that gave excellent results in the practice of the invention is a dead soft Armco iron which had .01 to .03 carbon content, while plain carbon steel No. 1005 also gave good results when used as a material for making the return spring 18.

Fig. 2 of the drawings shows diagrammatically in exaggerated form the initial length of the return spring 18, its length when loaded, its initial yield point, return from initial yield point, etc. This illustrative cycle shows that, for example, a spring might have three different yield points as it is compressed and thus take three new and progressively shorter released lengths as the brake lining blocks wear so the return spring is progressively compressed but functions to provide a desired small operative clearance when the brake is released. The spring 18 of the drawing is made to the length designated "Formed." Where the brake clearance is normal engagement of the brake will compress the spring to the dimension designated "Loaded." Should wear of the brake occur to such an extent that the brake block must move a distance greater than the normal clearance to a position indicated by the first "Yield Point" reading downwardly of Fig. 2, the spring would take enough permanent set as merely to recover to the length marked "Recovery." The result would be that the brake block is returned by the spring a lesser distance and the normal clearance therefore reestablished. Thereafter, the spring operates to return the brake block until additional wear of the block permits the spring to be compressed to the second "Yield Point." Thus progressive shortening the spring occurs and automatic clearance adjustment is attained. Actually the spring in operation would have almost an infinite number of new released lengths as it would take a new set every time an infinitesimal layer of brake lining is worn off. The spring can be stretched out to substantially its original length when the worn-out brake lining blocks 12 and 13 would be replaced with new blocks and be ready for a second operative cycle. Usually the yield point in pounds of strength of the spring at its various lengths would be substantially equal.

From the foregoing, it will be seen that a relatively simple but inexpensive type of a return spring has been provided in the novel brake of the invention and that the construction provided will effectively function to provide the desired operating clearances in the brake, but yet will permit the movement of brake linings axially of the brake as lining wear occurs so that the brake lining blocks can be maintained in desired close relationship to a brake disc for braking action. Thus it is thought that the objects of the invention are achieved.

While a certain representative embodiment and details have been shown for the purpose of illustrating the invention, it will be apparent to those skilled in this art that various changes and modifications may be made therein without departing from the spirit or scope of the invention.

Having thus described my invention, what is claimed is:

1. Brake mechanism for applying a decelerating force to a rotatable braking surface, said mechanism comprising a block of material opposed to the rotatable surface and normally spaced therefrom, support means retaining said block against movement in the direction of rotation of said surface while permitting movement toward said surface, block-moving means for moving said block from a retracted position into frictional engagement with said rotating surface, said block having an expendible brake lining subjected to wear by such frictional engagement and thereby reducing the dimension of said block, and a metallic spring mounted between said support and said block in opposed compressed relation to said block-moving means and arranged to hold said block in its retracted position, with the lining out of engagement with said rotatable surface by a determinate space independent of such wear, said spring being of material having such elastic properties as to take permanent set when compressed by movement of said block toward said braking surface over a distance exceeding the determinate clearance space therebetween but to fully recover from compressive movement not exceeding such determinate clearance space.

2. Brake mechanism for applying a decelerating force to a rotatable braking surface, said mechanism comprising a block of material opposed to the rotatable surface and normally spaced therefrom, support means retain said block against movement in the direction of rotation of said surface while permitting movement toward said surface, block-moving means for moving said block from a retracted position into frictional engagement with said rotating surface, said block having an expendible brake lining subjected to wear by such frictional engagement and thereby reducing the dimension of said block, and a metallic spring mounted between said support and said block in opposed compressed relation to said block-moving means and arranged to hold said block in its retracted position with the lining out of engagement with said rotatable surface by a determinate space independent of such wear, said spring being of material having a limit of elasticity at an amount of distortion incident to movement of said spring under force of said block-moving means exceeding the normal movement necessary to close said space.

3. Brake mechanism for applying a decelerating force to a rotatable braking surface, said mechanism comprising a block of material opposed to the rotatable surface and normally spaced therefrom, support means retaining said block against movement in the direction of rotation of said surface while permitting movement toward said surface, block-moving means for moving said block from a retracted position into frictional engagement with said rotating surface, said block having an expendible brake lining subjected to wear by such frictional engagement and thereby reducing the dimension of said block, and a metallic spring mounted between said support and said block in opposed compressed relation to said block-moving means and arranged to hold said block in its retracted position with the lining out of engagement with said rotatable surface, said spring being of material providing elasticity of the spring within normal distortion under force closing said spring by a determinate amount in closing said space and exceeding the yield point when distorted by movement exceeding such space.

References Cited in the file of this patent

UNITED STATES PATENTS

| | | |
|---|---|---|
| 2,392,970 | Bricker | Jan. 15, 1946 |
| 2,503,755 | Martin et al. | Apr. 11, 1950 |
| 2,556,976 | Oetzel | June 12, 1951 |
| 2,631,840 | Bugenhagen | Mar. 17, 1953 |
| 2,644,549 | Cagle | July 7, 1953 |